(12) United States Patent
Chu (10) Patent No.: US 11,756,179 B2
(45) Date of Patent: Sep. 12, 2023

(54) TRAINING METHOD FOR ANOMALY DETECTION MODEL AND ELECTRONIC DEVICE USING THE SAME

(71) Applicant: PEGATRON CORPORATION, Taipei (TW)

(72) Inventor: Shih-Jen Chu, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 437 days.

(21) Appl. No.: 17/081,334

(22) Filed: Oct. 27, 2020

(65) Prior Publication Data
US 2021/0150698 A1    May 20, 2021

(30) Foreign Application Priority Data
Nov. 14, 2019 (TW) ................... 108141454

(51) Int. Cl.
*G06T 7/00* (2017.01)
*G06N 20/00* (2019.01)

(52) U.S. Cl.
CPC ........... *G06T 7/0004* (2013.01); *G06N 20/00* (2019.01); *G06T 2207/20021* (2013.01); *G06T 2207/20081* (2013.01); *G06T 2207/30141* (2013.01)

(58) Field of Classification Search
CPC .......... G06N 20/20; G06T 2207/20081; G06T 2207/20021; G06T 7/0004; G06T 2207/30141; G06T 7/00
See application file for complete search history.

(56) References Cited

U.S. PATENT DOCUMENTS

| 9,547,911 B2 | 1/2017 | Chen |
| 10,380,724 B1 * | 8/2019 | Kim ........................ G06V 10/82 |
| 10,825,148 B2 * | 11/2020 | Tagra ........................ G06T 7/13 |

FOREIGN PATENT DOCUMENTS

| CN | 105808923 | 7/2016 |
| CN | 107016665 | 8/2017 |
| CN | 107154023 | 9/2017 |

(Continued)

OTHER PUBLICATIONS

Office Action of Taiwan Counterpart Application, dated Dec. 14, 2021, pp. 1-5.

(Continued)

*Primary Examiner* — Tuan H Nguyen
(74) *Attorney, Agent, or Firm* — J.C. PATENTS (57) ABSTRACT

A training method for an anomaly detection model and an electronic device using the same are provided. The anomaly detection model includes a generative model and a discriminative model. The training method for the anomaly detection model includes the following steps. One of a plurality of original images and one of a plurality of task information are used as a training sample. The training sample is input to the generative model and the discriminative model to calculate a plurality of network loss results corresponding to the training sample. If the original image of the training sample does not match the task information of the training sample, a first loss function is obtained based on a weighted sum of reciprocals of the network loss results, and the generative model is trained according to the first loss function.

12 Claims, 5 Drawing Sheets

(56) References Cited

FOREIGN PATENT DOCUMENTS

| | | |
|---|---|---|
| CN | 107220604 | 9/2017 |
| WO | 2009051915 | 4/2009 |

OTHER PUBLICATIONS

Kyota Higa et al., "Anomaly Detection Combining Discriminative and Generative Models", 2019 IEEE International Conference on Imaging Systems and Techniques (IST), Dec. 2019, with English abstract, pp. 1-3.

David Huang, "Bayesian Theorem in Machine Learning: Generative Model and Discriminative Model", Mar. 21, 2017, with English translation thereof, Available at: https://taweihuang.hpd.io/2017/03/21/mlbayes/.

* cited by examiner

TRAINING METHOD FOR ANOMALY DETECTION MODEL AND ELECTRONIC DEVICE USING THE SAME

CROSS-REFERENCE TO RELATED APPLICATION

This application claims the priority benefit of Taiwan application no. 108141454, filed on Nov. 14, 2019. The entirety of the above-mentioned patent application is hereby incorporated by reference herein and made a part of this specification.

BACKGROUND

Technology Field

The disclosure relates to a model training method, and more particularly, to a training method for an anomaly detection model and an electronic device using the same.

Description of the Related Art

Under the waves of deep learning, an anomaly detection of images has achieved rapid development. A common approach is to reconstruct errors based on automatic encoders for the anomaly detection. The advantage of this approach is that the anomaly detection model may be trained simply by using a normal training sample, instead of training the anomaly detection mode with an anomaly training sample that is not easy to obtain in practice.

However, the current anomaly detection model is usually used to perform one single anomaly detection task. If it is desired that a single anomaly detection model performs multiple anomaly detection tasks it might be realized only when anomaly features defined by each detection task do not significantly overlap with normal features defined by the other detection tasks. For example, if the anomaly features of one detection task among the multiple anomaly detection tasks happen to be the normal features of another detection task, the multiple anomaly detection tasks above cannot be performed through the same anomaly detection model. In this case, too many corresponding anomaly detection model might be established and trained for all the multiple anomaly detection tasks. Consequently, the development cost and complexity of the multiple anomaly detections are dramatically increased.

SUMMARY

In view of this, the disclosure provides a training method for an anomaly detection model and an electronic device using the same, which can allow a single trained anomaly detection model to perform the multiple anomaly detection tasks.

A training method for an anomaly detection model of the disclosure is used on an electronic device. The anomaly detection model includes a generative model and a discriminative model. The training method for the anomaly detection model includes the following steps. One of a plurality of original images and one of a plurality of task information are used as a training sample. The training sample is input to the generative model and the discriminative model to calculate a plurality of network loss results corresponding to the training sample. If the original image of the training sample does not match the task information of the training sample, a first loss function is obtained based on a weighted sum of reciprocals of the network loss results, and the generative model is trained according to the first loss function.

An electronic device of the disclosure includes a memory and a processor. The memory is configured to store a plurality of original images and a plurality of task information. The processor is coupled to the memory, and configured to run an anomaly detection model. The anomaly detection model includes a generative model and a discriminative model. The processor is configured to perform following steps: One of the original images and one of the of task information are used as a training sample. The training sample is input to the generative model and the discriminative model to calculate a plurality of network loss results corresponding to the training sample. If the original image of the training sample does not match the task information of the training sample, a first loss function is obtained based on a weighted sum of reciprocals of the network loss results, and the generative model is trained according to the first loss function.

Based on the above, the training method of the anomaly detection model and the electronic device using the same provided in the disclosure may use the original image and the task information as the training sample of the anomaly detection model, so that the anomaly detection model may generate the network loss results based on the training sample. Further, if the original image of the training sample does not match the task information of the training sample, the first loss function is obtained based on the weighted sum of reciprocals of the network loss results, and the generative model in the anomaly detection model is trained according to the first loss function. In this way, because the anomaly detection model may learn based on various arrangements and combinations of the task information and the original images, a single trained anomaly detection model is able to perform the multiple anomaly detection tasks.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

In order to make content of the disclosure more comprehensible, embodiments are described below as the examples to prove that the disclosure can actually be realized. Moreover, elements/components/steps with same reference numerals represent same or similar parts in the drawings and embodiments.

Figure 1:
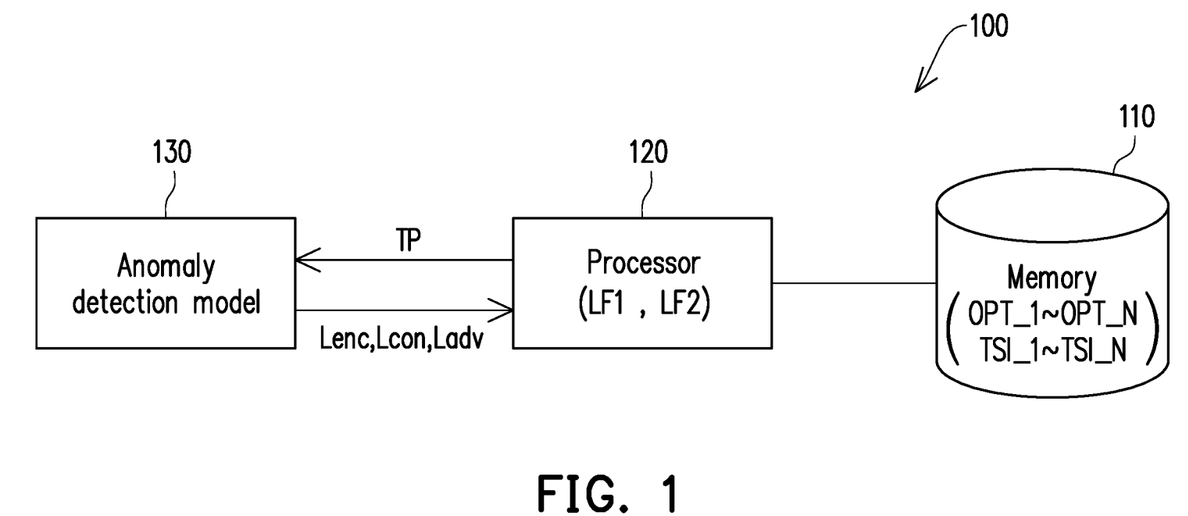
FIG. 1 is a circuit block diagram illustrating an electronic device according to an embodiment of the disclosure.

FIG. 1 is a circuit block diagram illustrating an electronic device according to an embodiment of the disclosure. Referring to FIG. 1, an electronic device 100 may be, for example, a personal computer, a server, a laptop, a tablet computer, a smart phone and the like. However, the disclosure is not limited in this regard. The electronic device 100 includes a memory 110 and a processor 120, but not limited thereto.

The memory 110 is configured to store a plurality of original images OPT_1 to OPT_N and a plurality of task information TSI_1 to TSI_N. Here, each of the original images OPT_1 to OPT_N corresponds to one of the task information TSI_1 to TSI_N. More specifically, if an original image OPT_1 corresponds to a task information TSI_1, it means that the original image OPT_1 matches the task information TSI_1. On the contrary, if an original image OPT_1 does not correspond to a task information TSI_1, it means that the original image OPT_1 does not match the task information TSI_1.

In an embodiment of the disclosure, the memory 110 may be, for example, a fixed or a movable device in any possible forms including a random access memory (RAM), a read-only memory (ROM), a flash memory, a hard drive or other similar devices, or a combination of the above-mentioned devices. However, the disclosure is not limited in this regard.

The processor 120 is coupled to the memory 110, and configured to run an anomaly detection model 130. In an embodiment of the disclosure, the processor 110 may be a central processing unit (CPU), a system-on-chip (SOC), an application processor, a graphics processor (GPU), a microprocessor, a digital signal processor, a programmable controller, an application specific integrated circuit (ASIC), a programmable logic device (PLD), or other similar devices or a combination of the above devices. The disclosure does not limit the type of the processor 120. In some embodiments, the processor 120 is, for example, responsible for the overall operation of the electronic device 100.

In some embodiments of the disclosure, the processor 120 may run the anomaly detection model 130 to perform multiple anomaly detections on a circuit board on a test machine, or perform multiple anomaly detections on items on a conveyor belt of production line. However, the disclosure is not limited in this regard.

Figure 2:
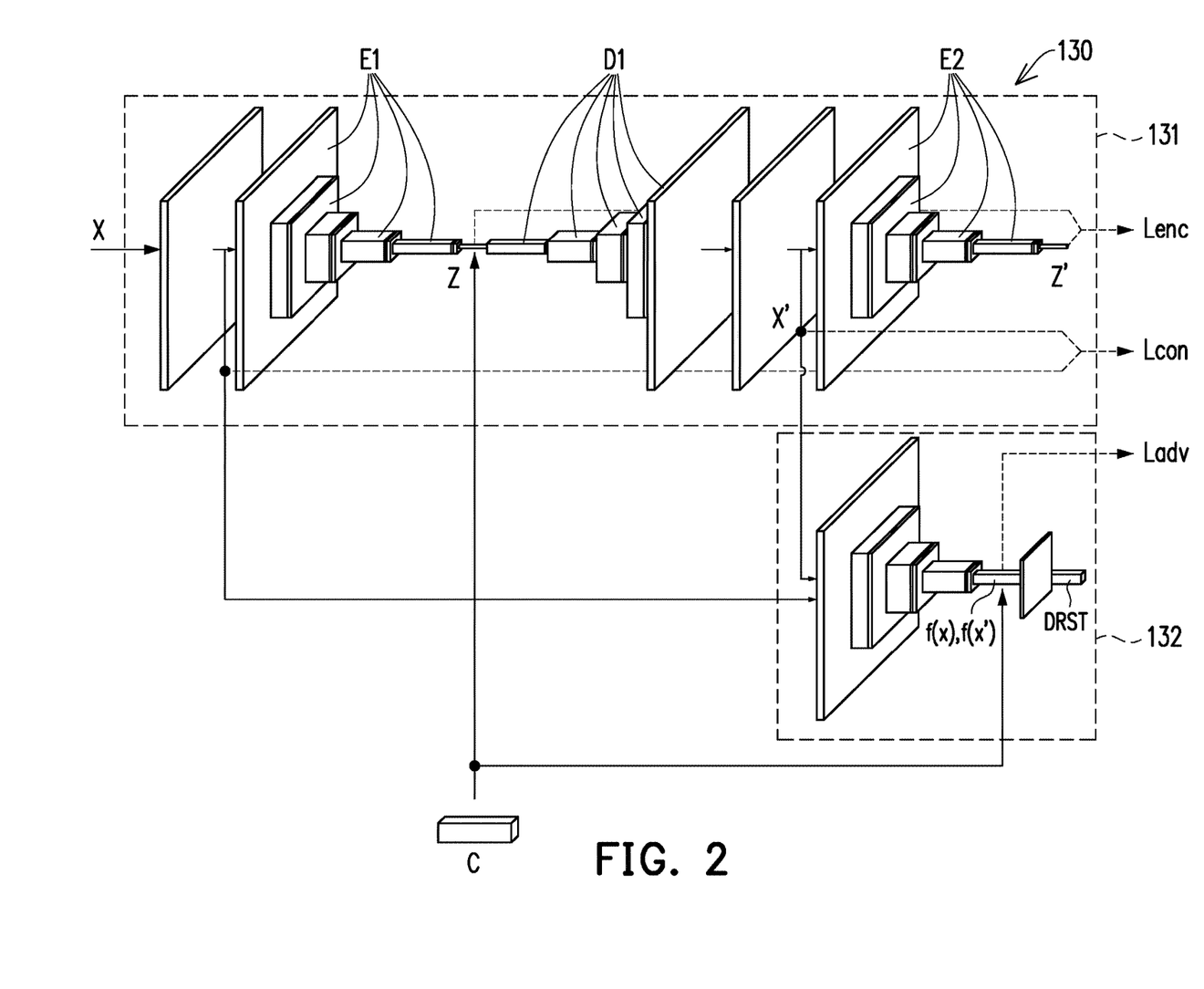
FIG. 2 is a schematic diagram illustrating a framework of an anomaly detection model according an embodiment of the disclosure.

FIG. 2 is a schematic diagram illustrating a framework of an anomaly detection model according an embodiment of the disclosure. Referring to FIG. 2, the anomaly detection model 130 may be, for example, a Generative Adversarial Networks (GAN) model. More specifically, the anomaly detection model 130 may be, for example, a GANomaly model, which includes a generative model 131 and a discriminative model 132. In the embodiments of the disclosure, the training of the anomaly detection model 130 is, for example, used to adjust various parameters and weight values used by the processor 120 when running the anomaly detection model 130, and the actual multiple anomaly detection tasks are performed by using, for example, the trained anomaly detection model 130 to detect multiple anomalies.

Figure 3:
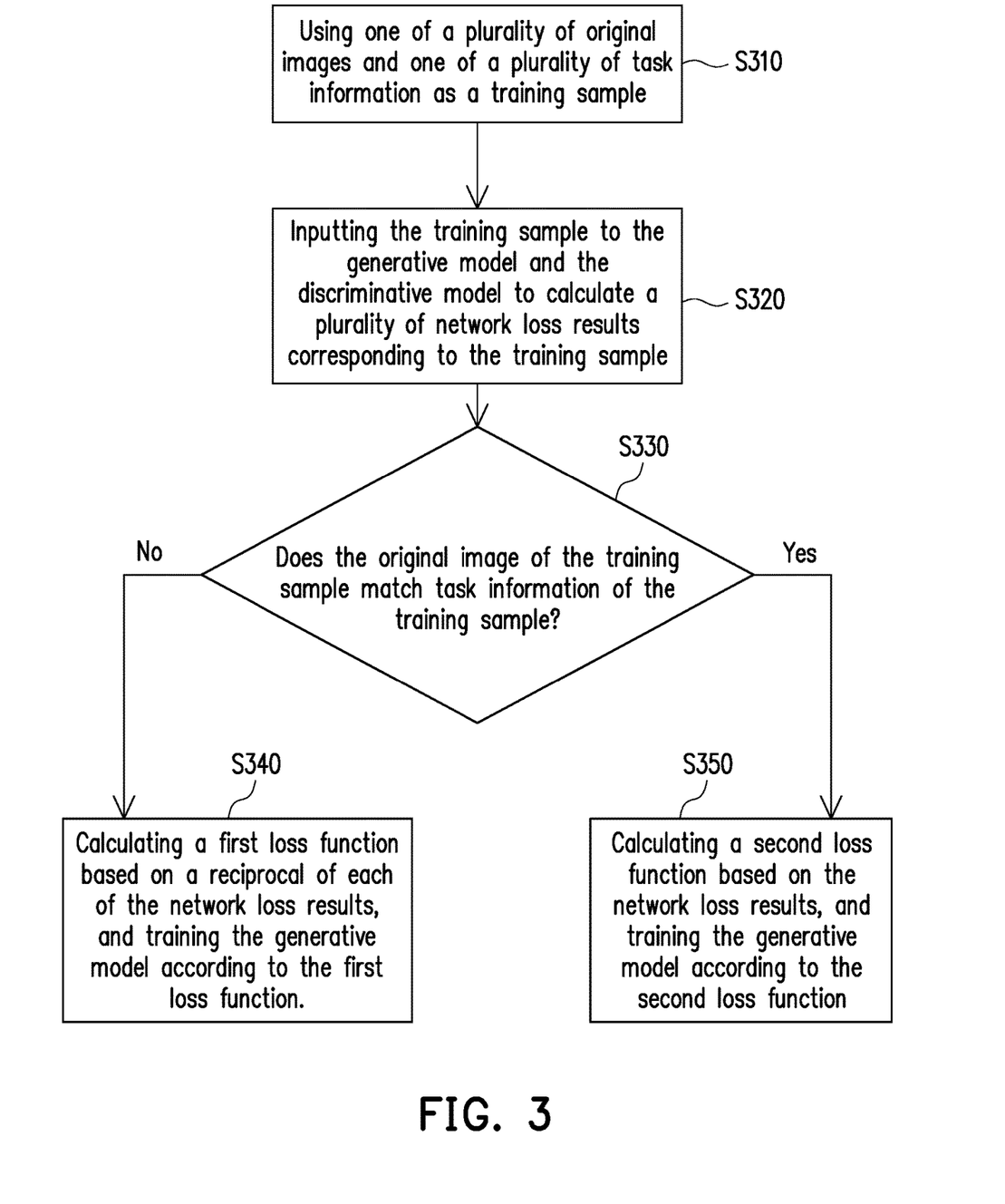
FIG. 3 is a flowchart illustrating steps in a training method for an anomaly detection model according to an embodiment of the disclosure.

FIG. 3 is a flowchart illustrating steps in a training method for a anomaly detection model according to an embodiment of the disclosure, which is applicable to the electronic device 100 of FIG. 1 but not limited thereto. Referring to FIG. 1 to FIG. 3 together, first of all, in step S310, the processor 120 may use one of the original images OPT_1 to OPT_N and one the task information TSI_1 to TSI_N as a training sample TP. The, in step S320, the processor 120 may input the training sample TP to the generative model 131 and the discriminative model 132 to calculate a plurality of network loss results Lenc, Lcon and Ladv corresponding to the training sample TP. In detail, as shown in FIG. 2, the processor 120 may input an original image x and task information c in the training sample TP to the generative model 131 and the discriminative model 132 to calculate the network loss results Lenc, Lcon and Ladv. Then, in step S330, the processor 120 may determine whether the original image x of the training sample TP matches the task information c of the training sample TP.

If a determination result of step S330 is no, that is, the original image x of the training sample TP does not match the task information c of the training sample TP. In step S340, the processor 120 may obtain a first loss function LF1 based on a weighted sum of reciprocals of the network loss results Lenc, Lcon and Ladv, and train the generative model 131 according to the first loss function LF1. In other words, the processor 120 may adjust various parameters and weight values in the generative model 131 based on the first loss function LF1.

In an embodiment of the disclosure, the first loss function LF1 may be calculated based on Equation (1) below, where W11, W12, and W13 are weight values corresponding to the network loss results Lenc, Lcon and Ladv, respectively, which may be set based on practical applications.

$$LF1 = W11 \times \frac{1}{Lenc} + W12 \times \frac{1}{Lcon} + W13 \times \frac{1}{Ladv} \qquad \text{Equation (1)}$$

On the contrary, if the determination result in step S330 is yes, that is, the original image x of the training sample TP matches the task information c of the training sample TP. In step S350, the processor 120 may obtain a second loss function LF2 based on the network loss results Lenc, Lcon and Ladv, and train the generative model 131 according to the second loss function LF2. In other words, the processor 120 may adjust the various parameters and the weight values in the generative model 131 based on the second loss function LF2.

In an embodiment of the disclosure, the second loss function LF2 may be calculated based on Equation (2) below, where W21, W22, and W23 are the weight values corresponding to the network loss results, respectively, Lenc, Lcon and Ladv, which may be set based on practical applications.

$$LF2 = W21 \times Lenc + W22 \times Lcon + W23 \times Ladv \qquad \text{Equation (2)}$$

Because the processor 120 inputs the original image x and the task information c to the anomaly detection model 130 and trains the anomaly detection model 130 by the first loss function LF1 or the second loss function LF2 based on whether the original image x matches the task information c, the anomaly detection model 130 can learn based on various arrangements and combinations of the task information TSI_1 to TSI_N and the original images OPT_1 to OPT_N. In this way, the trained anomaly detection model 130 can perform the multiple anomaly detection tasks.

In an embodiment of the disclosure, the processor 120 may encode the task information c to obtain a task code, and use the original image x and the task code of the task information c as the training sample TP. In an embodiment of the disclosure, the processor 120 may perform one-hot encoding on the task information c to obtain the task code, but the disclosure is not limited thereto. In other embodiments of the disclosure, the processor 120 may also use another encoding method to encode the task information c to obtain the task code, depending on the practical application and design requirements.

Figure 4:
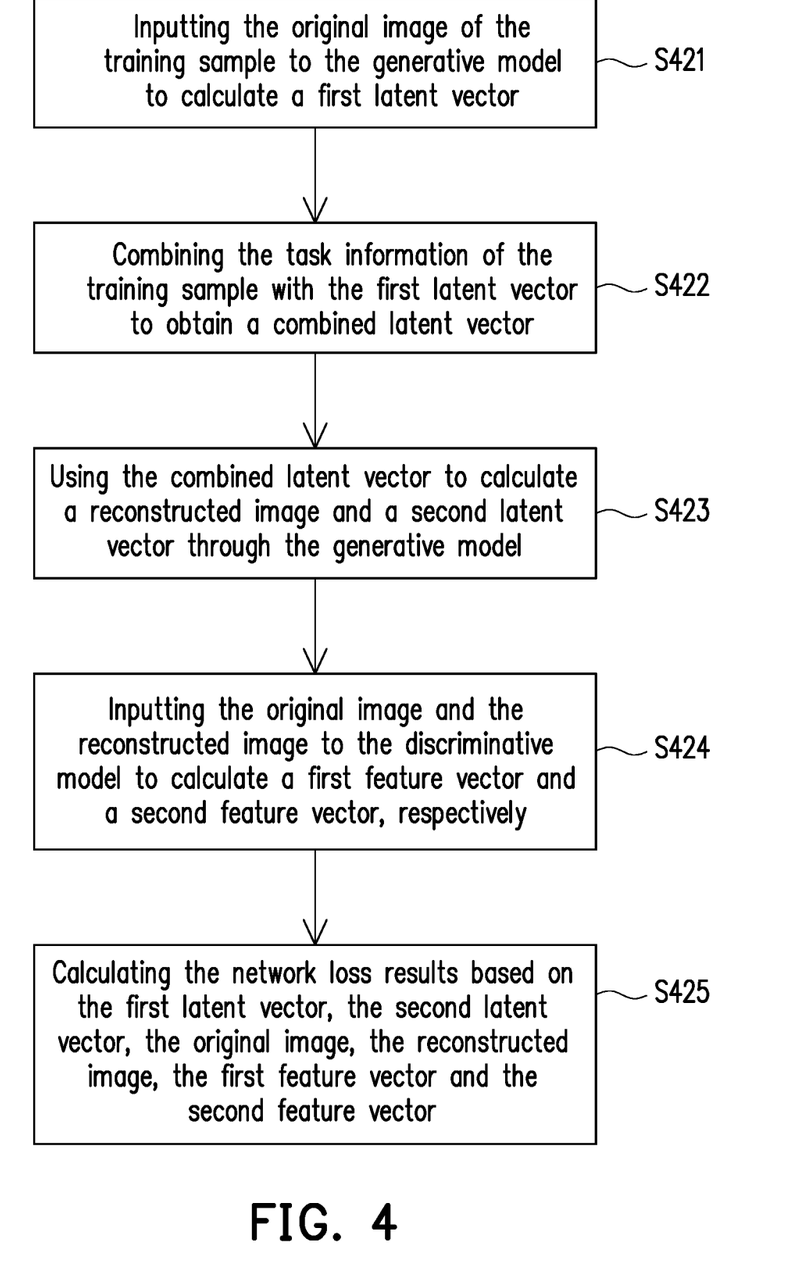
FIG. 4 is a flowchart illustrating detailed steps in step S320 of FIG. 3 according to an embodiment of the disclosure.

FIG. 4 is a flowchart illustrating detailed steps in step S320 of FIG. 3 according to an embodiment of the disclosure. Referring to FIGS. 1 to 4 together, step S320 of FIG. 3 may include detailed steps S421 to S425. First, in step S421, the original image x of the training sample TP may be input to the generative model 131 to calculate a first latent vector z. Next, in step S422, the task information c of the training sample TP may be combined with the first latent vector z to obtain a combined latent vector. In an embodiment of the disclosure, the combined latent vector may be obtained by concatenating the task information c after the first latent vector z, but the disclosure is not limited thereto. Here, "concatenating" means that two vectors (i.e., the task information c and the first latent vector z) are connected in series without changing vector elements of the task information c and vector elements of the first latent vector z. Specifically, assuming that the task information c is a vector of M*1 and the first latent vector z is a vector of N*1, the combined latent vector generated by concatenating the task information c and the first latent vector z is a vector of (M+N)*1. In addition, the vector elements of the combined latent vector are composed of the vector elements of the task information c and the vector elements of the first latent vector z.

Then, in step S423, the combined latent vector is used to calculate a reconstructed image x' and a second latent vector z' through the generative model 131. Next, in step S424, the original image x and the reconstructed image x' are input to the discriminative model 132 to calculate a first feature vector f(x) and a second feature vector f(x'), respectively. Then, in step S425, the network loss results Lenc, Lcon and Ladv are calculated based on the first latent vector z, the second latent vector z', the original image x, the reconstructed image x', the first feature vector f(x) and the second feature vector f(x').

In detail, the generative model 131 may include an encoder E1, a decoder D1 and an encoder E2. The encoder E1 may encode the original image x to generate the first latent vector z. The decoder D1 may combine the first latent vector z with the task information c to obtain the combined latent vector, and decode the combined latent vector to generate the reconstructed image x'. The encoder E2 may encode the reconstructed image x' to generate the second latent vector z'.

Then, the processor 120 may calculate a difference between the original image x and the reconstructed image x' at a pixel level to obtain the network loss result Lcon, calculate a difference between the first feature vector f(x) and the second feature vector f(x') at a feature level to obtain the network loss result Ladv, and calculate a difference between the first latent vector z and the second latent vector z' at a latent vector level to obtain the network loss result Lenc, which are shown in Equation (3) to Equation (5), respectively.

$$Lcon = \|x - x'\|_1 \quad \text{Equation (3)}$$

$$Ladv = \|f(x) - f(x')\|_2 \quad \text{Equation (4)}$$

$$Lenc = \|z - z'\|_2 \quad \text{Equation (5)}$$

After obtaining the network loss results Lcon, Ladv and Lenc, the processor 120 may substitute Equation (3) to Equation (5) into Equation (1) or Equation (2) to calculate the first loss function LF1 or the second loss function LF2, and thereby train the generative model 131.

The processor 120 may train the generative model 131 and the discriminative model 132 by turns. At the stage of training the discriminative model 132, the processor 120 may combine the task information c of the training sample TP with the first feature vector f(x) or the second feature vector f(x') to obtain a combined feature vector. In an embodiment of the disclosure, the combined feature vector may be obtained by concatenating the task information c after the first feature vector f(x) or the second feature vector f(x'), but the disclosure is not limited thereto.

Then, the processor 120 obtains a discriminative result DRST by performing a calculation on the combined feature vector through the discriminative model 132, and trains the discriminative model 132 according to the discriminative result DRST. In other words, the processor 120 may adjust various parameters and weight values in the discriminative model 132 based on the discriminative result DRST.

In an embodiment of the disclosure, the discriminative model 132 may perform a calculation on the combined feature vector through Softmax function to obtain the discriminative result DRST. Here, the discriminative result DRST includes the following four types: the image input to the discriminative model 132 is a real image; the image input to the discriminative model 132 is a fake image; the image input to the discriminative model 132 is a real image and does not match the task information c; the image input to the discriminative model 132 is a fake image and does not match the task information c. In the following, an application scenario is used to illustrate the training method for the anomaly detection model 130.

Figure 5:
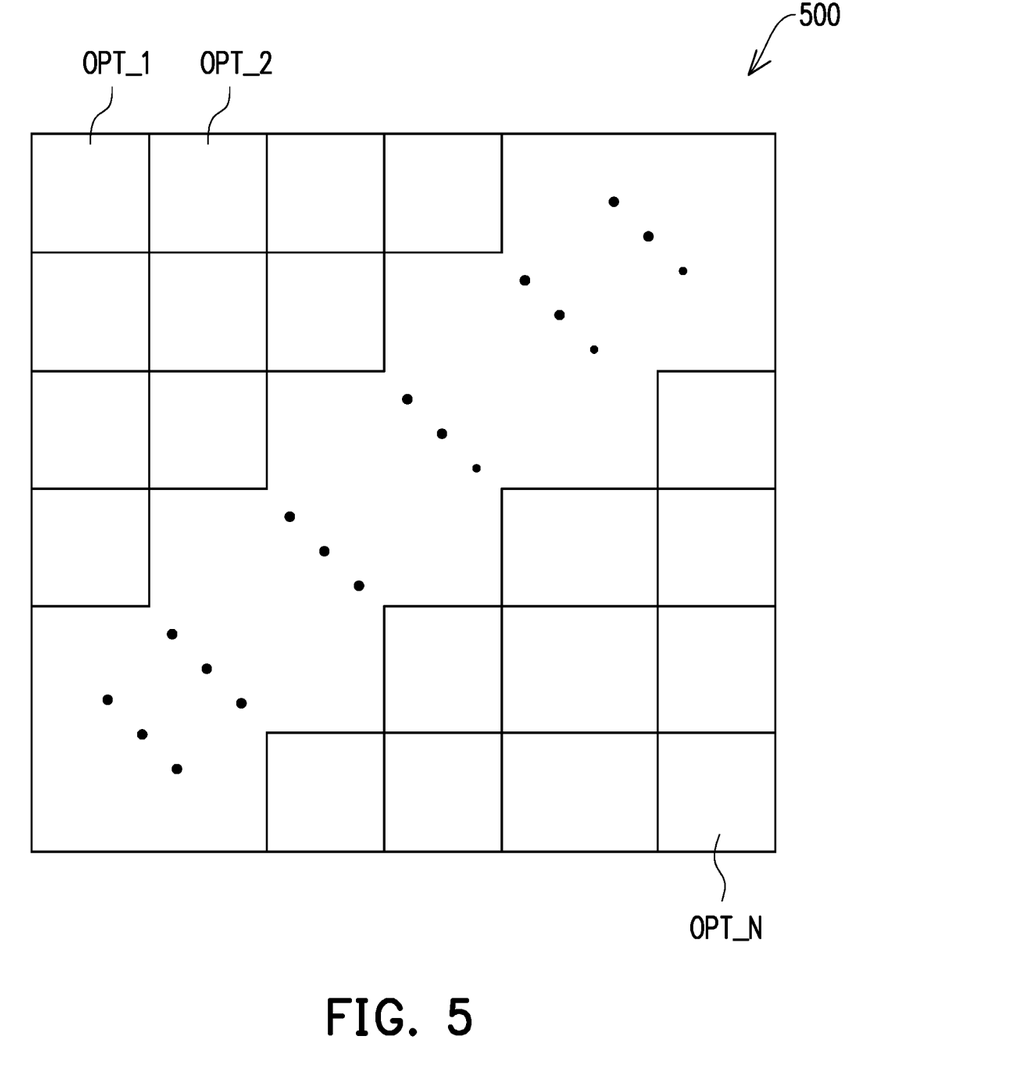
FIG. 5 is a schematic diagram for dividing a training picture into a plurality of original images according to an embodiment of the disclosure.

In an application scenario of the disclosure, the processor 120 may divide a training picture 500 shown in FIG. 5 into the original images OPT_1 to OPT_N, use position information of where the original images OPT_1 to OPT_N are located on the training picture 500 as the task information TSI_1 to TSI_N, and store the original images OPT_1 to OPT_N and the task information TSI_1 to TSI_N into the memory 110.

For example, it is assumed that the training picture 500 is a captured picture of a circuit board; the original image OPT_1 is an image of the component area where capacitors are welded, and is located at a first position of the training picture 500 (i.e., the task information TSI_1 is "First Position"); and the original image OPT_2 is an image of the component area where no capacitor is welded and is located at a second position of the training picture 500 (i.e., the task information TSI_2 is "Second position"). Accordingly, if the processor 120 uses the original image OPT_1 and the task information TSI_1 (or the original image OPT_2 and the task information TSI_2) as the training sample TP to be input to the generative model 131 and the discriminative model 132 to calculate the network loss result Lenc, Lcon and Ladv, the processor 120 trains the generative model 131 according to the second loss function LF2 because the original image OPT_1 matches the task information TSI_1 (or the original image OPT_2 matches the task information TSI_2).

In contrast, if the processor 120 uses the original image OPT_1 and the task information TSI_2 (or the original image OPT_2 and the task information TSI_1) as the training sample TP to be input to the generative model 131 and the discriminative model 132 to calculate the network loss result Lenc, Lcon and Ladv, the processor 120 trains the generative model 131 according to the first loss function LF1 because the original image OPT_1 does not match the task information TSI_2 (or the original image OPT_2 does not match the task information TSI_1).

In addition, at the stage of training the discriminative model 132, if the processor 120 uses the original image OPT_1 and the task information TSI_1 as the training sample TP to be input to the discriminative model 132, the discriminative model 132 may generate a feature vector based on the original image OPT_1; the discriminative model 132 may combine the task information TSI_1 with the feature vector generated by the discriminative model 132 to obtain the combined feature vector; and the discriminative model 132 may perform a calculation on the combined feature vector to obtain the discriminative result DRST. Based on that the original image OPT_1 is the real image and matches the task information TSI_1, the processor 120 may train the discriminative model 132 based on the obtained discriminative result DRST.

In contrast, if the processor 120 uses the original image OPT_1 and the task information TSI_2 as the training sample TP to be input to the discriminative model 132, the discriminative model 132 may generate a feature vector based on the original image OPT_1; the discriminative model 132 may combine the task information TSI_2 with the feature vector generated by the discriminative model 132 to obtain the combined feature vector; and the discriminative model 132 may perform a calculation on the combined feature vector to obtain the discriminative result DRST. Based on that the original image OPT_1 is the real image and does not match the task information TSI_2, the processor 120 may train the discriminative model 132 based on the obtained discriminative result DRST.

Similarly, if the processor 120 uses the reconstructed image of the original image OPT_1 and the task information TSI_1 as the training sample TP to be input to the discriminative model 132, the discriminative model 132 may generate a feature vector based on the reconstructed image of the original image OPT_1; the discriminative model 132 may combine the task information TSI_1 with the feature vector generated by the discriminative model 132 to obtain the combined feature vector; and the discriminative model 132 may perform a calculation on the combined feature vector to obtain the discriminative result DRST. Based on that the reconstructed image of the original image OPT_1 is the fake image and matches the task information TSI_1, the processor 120 may train the discriminative model 132 based on the obtained discriminative result DRST.

In contrast, if the processor 120 uses the reconstructed image of the original image OPT_1 and the task information TSI_2 as the training sample TP to be input to the discriminative model 132, the discriminative model 132 may generate a feature vector based on the reconstructed image of the original image OPT_1; the discriminative model 132 may combine the task information TSI_2 with the feature vector generated by the discriminative model 132 to obtain the combined feature vector; and the discriminative model 132 may perform a calculation on the combined feature vector to obtain the discriminative result DRST. Based on that the reconstructed image of the original image OPT_1 is the fake image and does not match the task information TSI_2, the processor 120 may train the discriminative model 132 based on the obtained discriminative result DRST.

After multiple training s, the anomaly detection model 130 may determine whether the currently input image is real or fake based on the input task information (the position information), and determine whether the input image matches the input task information (the position Information). In this way, the anomaly detection model 130 can perform the two detection tasks regarding "the component area with a welded capacitor" and "the component area without a welded capacitor".

In summary, the training method for the anomaly detection model and the electronic device using the same provided in the embodiments of the disclosure can use the original image and the task information as the training sample of the anomaly detection model, so that the anomaly detection model can generate the network loss results based on the training sample. Further, if the original image of the training sample does not match the task information of the training sample, the first loss function is obtained based on the weighted sum of reciprocals of the network loss results, and the generative model in the anomaly detection model is trained according to the first loss function. In this way, the one single trained anomaly detection model is able to perform the multiple anomaly detection tasks because the anomaly detection model can learn based on various arrangements and combinations of the task information and the original images.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

The invention claimed is:

1. A training method for an anomaly detection model for an electronic device, wherein the anomaly detection model comprises a generative model and a discriminative model, and the training method comprising:
   using one of a plurality of original images and one of a plurality of task information as a training sample;
   inputting the training sample to the generative model and the discriminative model to calculate a plurality of network loss results corresponding to the training sample;
   if the original image of the training sample does not match the task information of the training sample, calculating a first loss function based on the network loss results, and training the generative model according to the first loss function; and
   if the original image of the training sample matches the task information of the training sample, calculating a second loss function based on the network loss results, and training the generative model according to the second loss function.

2. The training method for the anomaly detection model of claim 1, wherein the first loss function is calculated based on a weighted sum of reciprocals of the network loss results.

3. The training method for the anomaly detection model of claim 1, wherein the step of using one of the original images and one the task information as the training sample comprises:
   encoding the task information to obtain a task code; and
   using the original image and the task code as the training sample.

4. The training method for the anomaly detection model of claim 1, further comprising:
   dividing a training picture into the original images; and
   using position information of where the original images are located on the training picture as the task information.

5. The training method for the anomaly detection model of claim 1, wherein the step of inputting the training sample to the generative model and the discriminative model to calculate the network loss results corresponding to the training sample comprises:
    inputting the original image of the training sample to the generative model to calculate a first latent vector;
    combining the task information of the training sample with the first latent vector to obtain a combined latent vector;
    using the combined latent vector to calculate a reconstructed image and a second latent vector through the generative model;
    inputting the original image and the reconstructed image to the discriminative model to calculate a first feature vector and a second feature vector, respectively; and
    calculating the network loss results based on the first latent vector, the second latent vector, the original image, the reconstructed image, the first feature vector and the second feature vector.

6. The training method for the anomaly detection model of claim 5, further comprising:
    combining the task information of the training sample with the first feature vector or the second feature vector to obtain a combined feature vector, and
    obtaining a discriminative result by performing a calculation on the combined feature vector through the discriminative model, and training the discriminative model according to the discriminative result.

7. An electronic device, comprising:
    a memory, configured to store a plurality of original images and a plurality of task information; and
    a processor, coupled to the memory, and configured to run an anomaly detection model, wherein the anomaly detection model comprises a generative model and a discriminative model, and the processor is configured to perform following steps:
        using one of the original images and one of the task information as a training sample;
        inputting the training sample to the generative model and the discriminative model to calculate a plurality of network loss results corresponding to the training sample;
        if the original image of the training sample does not match the task information of the training sample, calculating a first loss function based on the network loss results, and training the generative model according to the first loss function; and
        if the original image of the training sample matches the task information of the training sample, calculating a second loss function based on the network loss results, and training the generative model according to the second loss function.

8. The electronic device of claim 7, wherein the first loss function is calculated based on a weighted sum of reciprocals of the network loss results.

9. The electronic device of claim 7, wherein the processor encodes the task information to obtain a task code, and uses the original image and the task code as the training sample.

10. The electronic device of claim 7, wherein the processor divides a training picture into the original images, uses position information of where the original images are located on the training picture as the task information, and stores the original images and the task information into the memory.

11. The electronic device of claim 7, wherein the processor is configured to perform following steps:
    inputting the original image of the training sample to the generative model to calculate a first latent vector;
    combining the task information of the training sample with the first latent vector to obtain a combined latent vector;
    using the combined latent vector to calculate a reconstructed image and a second latent vector through the generative model;
    inputting the original image and the reconstructed image to the discriminative model to calculate a first feature vector and a second feature vector, respectively; and
    calculating the network loss results based on the first latent vector, the second latent vector, the original image, the reconstructed image, the first feature vector and the second feature vector.

12. The electronic device of claim 11, wherein the processor is configured to perform following steps:
    combining the task information of the training sample with the first feature vector or the second feature vector to obtain a combined feature vector, and
    obtaining a discriminative result by performing a calculation on the combined feature vector through the discriminative model, and training the discriminative model according to the discriminative result.

\* \* \* \* \*